Jan. 4, 1944. L. LATINI 2,338,340
DECORATING APPARATUS FOR COATED CONFECTIONS AND THE LIKE
Filed Feb. 21, 1941 2 Sheets-Sheet 2
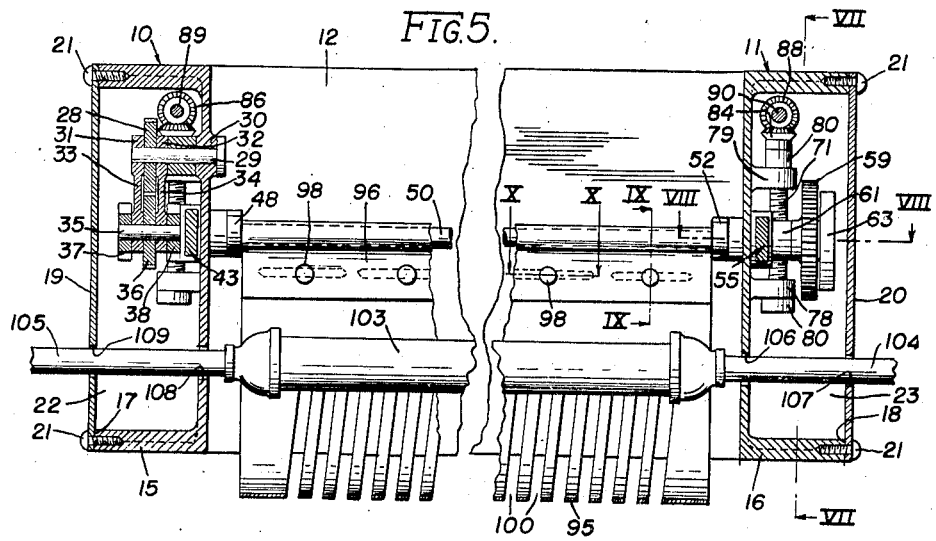
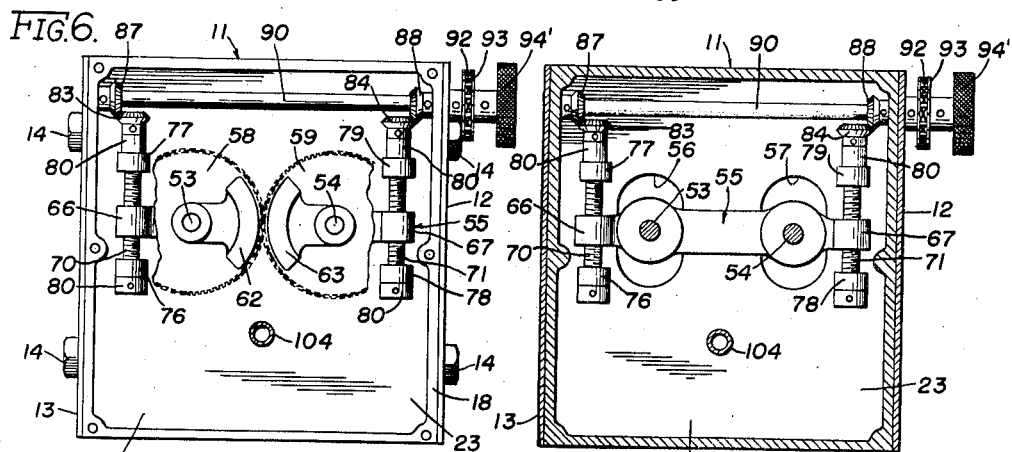
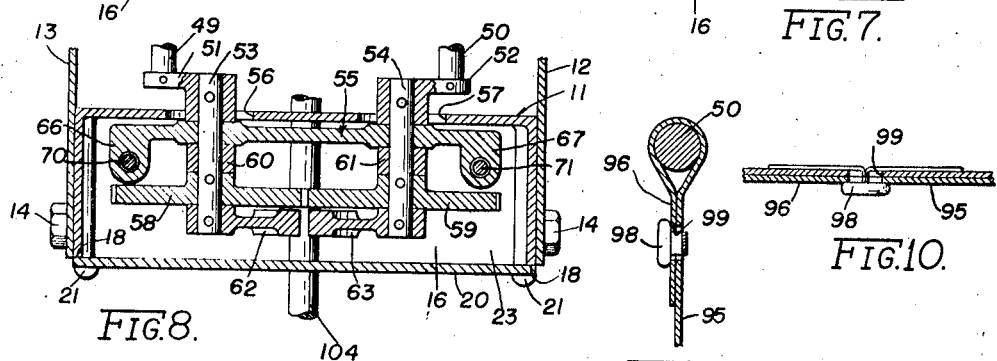
INVENTOR.
LEO LATINI
BY Harry C. Roberts
ATTORNEY.

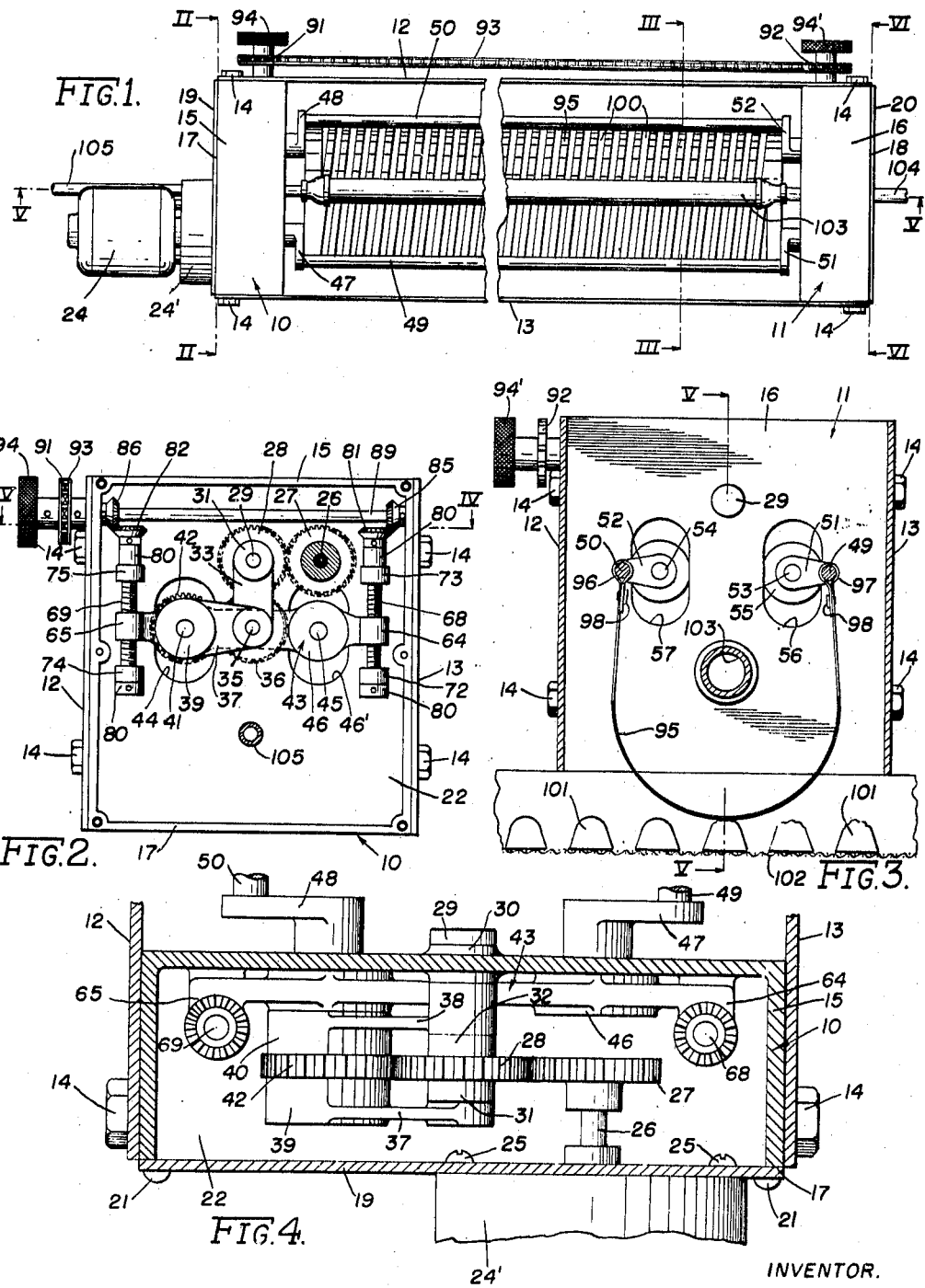

Patented Jan. 4, 1944

2,338,340

UNITED STATES PATENT OFFICE 2,338,340

DECORATING APPARATUS FOR COATED CONFECTIONS AND THE LIKE

Leo Latini, Chicago, Ill.

Application February 21, 1941, Serial No. 379,924

21 Claims. (Cl. 91—2)

This invention relates to an apparatus for decorating confections and more particularly to confection coating decorators, although certain features thereof may be employed with equal advantage for other purposes.

It contemplates more especially the provision of a simple and improved apparatus for imparting a variety of decorations to coated confections to impart thereto a fanciful and hand-dipped appearance.

Hand-dipped confections such as bon bons and chocolates have individuality in the surface decoration owing to the fact that their appearance depends entirely upon the finishing stroke used by the hand-dipper. High quality coated confections are, for the most part, hand-dipped in order to enable a wide variety of surface decoration and also to convey to the consumer that care has been exercised in the selection of ingredients and in the production of the final product. Many types of machines have heretofore been proposed to accomplish substantially this same appearance since the consumer attaches considerable significance to the appearance of coated confections.

Machines for this purpose have not, however, been widely adopted by candy manufacturers owing to their intricate structure and comparatively high cost, and further, their lack of flexibility in processing different types of coated confections to impart different surface effects or decorative appearance without seriously impairing production or requiring extended adjustments which entail time and labor. Consequently, the requirements of a machine to accomplish a surface decoration on coated confections is appreciable flexibility in applying a variety of decorations and adaptable to different types of coated confections even though such may be processed in comparatively small lots. Then, too, simplicity and inexpensive construction is highly desirable in a machine of this kind in order to compete with hand-dipping costs and equipment. With the knowledge of these requirements a comparatively inexpensive, simple, highly flexible, readily variable and very effective apparatus has been provided to impart surface decorations to coated confections.

One object of the present invention is to simplify the construction and improve the operation of devices of the character mentioned.

Another object is to provide a simple and inexpensive device for imparting a variety of surface decorations to coated confections in simulation of hand-dipped results.

Still another object is to provide apparatus for continuously imparting a variety of surface decorations to coated confections without entailing any appreciable time or labor in procuring a variety of hand-dipped simulations.

A further object is to provide an apparatus for reciprocating a flexible band in confronting relation with a confection supporting and transmitting conveyor to impart surface decorations to coated confections.

A still further object is to provide an apparatus for reciprocating a perforated band in confronting relation with a confection supporting and transmitting conveyor to impart surface decorations to coated confections.

Still a further object is to provide a readily adjustable apparatus for variably reciprocating a perforated band in confronting relation with a confection supporting and transmitting conveyor to impart surface decorations to coated confections.

Other objects and advantages will appear from the following description of an illustrative embodiment of the present invention.

In the drawings:

Figure 1 is a plan view of a machine embodying features of the present invention.

Figure 2 is a left end sectional view in elevation taken substantially along line II—II of Figure 1 with the frame end plate removed to clarify the showing.

Figure 3 is a sectional view in elevation taken substantially along line III—III of Figure 1.

Figure 4 is a sectional plan view taken substantially along line IV—IV of Figure 2.

Figure 5 is a fragmentary sectional view taken substantially along line V—V of Figures 1 and 3.

Figure 6 is a sectional right end sectional view taken substantially along line VI—VI of Figure 1 with the frame end plate removed to clarify the showing.

Figure 7 is a sectional view in elevation taken substantially along line VII—VII of Figure 5.

Figure 8 is a fragmentary plan sectional view taken substantially along line VIII—VIII of Figure 5.

Figure 9 is a fragmentary sectional view taken substantially along line IX—IX of Figure 5.

Figure 10 is a fragmentary sectional view taken substantially along line X—X of Figure 5.

The structure selected for illustration comprises a pair of substantially rectangular end members 10 and 11 which are maintained in spaced relation by rigid side plates 12 and 13 attached thereto by means of suitable fasteners such as threaded studs 14. The end members 10—11, preferably though not essentially, in this instance, comprise substantially U-shaped cast sections 15—16 having their open peripheral edge 17—18 (Figure 5) extending outwardly to receive end plates 19—20. The end plates 19—20 are attached to the peripheral edge 17—18 of the end members 10—11 by means of suitable fasteners such as threaded studs 21 to define end compartments 22—23 for confining instrumentalities to be hereinafter described.

The compartment 22 has a variable speed electric motor 24 with speed reducer 24' attached to the end plate 19 for rigid support thereon, the attachment being effected by means of threaded fasteners 25. The motor speed reducer driver shaft 26 extends into the compartment 22 to carry a pinion 27 which meshes with a spur gear 28 supported by a stud shaft 29 anchored in a boss 30 formed integral with the end member 10. The spur gear 28 is journalled on the shaft 29 between bearings 31 and 32 comprising a part of the links 33—34, respectively (Figure 5), that are formed integral with the end bearings carried by a stud shaft 35.

The stud shaft 35 has a spur gear 36 journalled thereon to mesh with the gear 28 so that rotation is imparted thereto responsive to the rotation of the gear 27 and in a corresponding direction therewith. The stud shaft 35 is supported by spaced links 37 and 38 (Figure 4) terminating in bearings 39—40, respectively, journalled on a shaft 41 between the spur gear 42 connected for rotation therewith. The shaft 41 is journalled in a horizontal cross-bar 43 to project through an elongated opening 44 provided in the end member 10.

Another stud shaft 45 is journalled in a boss 46 formed proximate to the other end of the cross bar 43 to project through an elongated opening 46' in the end member 10. Crank-arms 47 and 48 are attached to the stud shafts 41—45 to serve as a movable support for spaced rods 49 and 50 that extend parallel to the frame plates 12—13 between the end frames 15—16. The other end of the rods 49—50 is correspondingly supported by crank-arms 51—52 (Figure 1) that are fixed to stud shafts 53—54 (Figure 8) journalled in a cross-bar 55 for projecting through elongated openings 56—57 provided in the end member 11.

The stud shafts 53—54 carry a spur gear 58 and 59 to mesh with each other to rotate the crank arms 51—52 in opposite directions responsive to corresponding movement imparted to the rod 50 that is directly responsive to the operation of the motor 24. The spur gears 58—59 are spaced from the cross-bar 55 by spacer collars 60—61 and counterweights comprising, in this instance, cast sectors 62—63 which are attached to the free extremities of the stud shafts 53—54 to counter-balance the crank-arms 51—52 and their counterparts comprising the crank arms 47—48. Should further counter-balancing be deemed advisable, counterweight arms may be formed integral with the cranks 47—48 as offsets thereof.

It is to be noted that the crank arms 47—48 and 51—52 are mounted in order to enable their vertical adjustment relative to the fixed end sections 15—16. To this end, the cross-bars 43—55 confined in the compartments 22—23, are formed with end bearings 64—65 and 66—67, respectively, through which threaded rods 68, 69, 70 and 71, respectively, project in order to effect their adjustable support. To this end, the threaded vertical rods 68, 69, 70 and 71 are journalled in vertically spaced bearings 72—73, 74—75, 76—77 and 78—79 formed integral with the end members 10—11 within the compartments 22—23, respectively.

Suitable bearing and stop collars 80 are provided on the threaded rods 68, 69, 70 and 71 in order to enable their journalled rotation in the bearings 72—73, 74—75, 76—77, and 78—79 to raise and lower the cross-bars 43—55. This is effected by virtue of bevelled gears 81, 82, 83 and 84 that are fixed to the upper extremity of the threaded rods 68, 69, 70 and 71, respectively, to mesh with correspondingly bevelled gears 85, 86, 87 and 88. The bevelled gears 85—86 are fixed to a cross-shaft 89 journalled in the side frame plates 12—13. The bevelled gears 87—88 are correspondingly fixed to a cross-shaft 90 journalled in the side frame plates 12—13.

The cross-shafts 89—90 are positioned to project through the end frames 15—16 to support aligned sprockets 91 and 92 on externally accessible extensions thereof (Figure 1). The aligned sprocket wheels 91—92 are operatively connected through an endless chain 93 which meshes therewith so that rotation of the shafts 89 or 90 or vice versa will impart corresponding rotation to the other shaft. This preferably though not essentially is effected through knurled knobs 94 and 94' attached to the other extremities of the shafts 89—90, respectively. Consequently, the attendant can manipulate one or the other of the knurled knobs 94 or 94' depending upon which is more convenient in order to raise or lower the cross-bars 43—55 which will determine the vertical corresponding position of the rods 49—50 which are rotated in any desired timed relation or cycle responsive to the operation of the electric motor 24.

As shown, the rods 49—50 support a flexible band 95 which has overlapping edges 96—97 in embracing relation with the rods 49—50 for connection therethrough by means of suitable split brads 98 (Figures 9 and 10). The brads 98 project through aligned apertures 99 provided in the overlapping portions of the flexible band 95. The band 95 is preferably of appreciable expanse and may be advantageously provided with any suitable type of perforations, in this instance, a series of inclined parallel slits 100 that assume the shape of the band 95 that preferably though not essentially is made from oilcloth or similar sheet material to be normally suspended from the rods 49—50 that are movably supported by the cranks 47—48 and 51—52. The cranks 47—48 and 51—52 are preferably rotated in synchronized relation to impart a primarily reciprocable path of movement to the band 95 in confronting relation with coated confections 101 preferably though not essentially carried by the conveyor 102 comprising part of a standard enrober.

It should be observed that the instrumentalities supported by the end members 10—11 are positioned above the enrober conveyor 102 at the desired elevation so that the flexible band 95 will contact the coated confections 101 and require the yielding thereof in order to impart impressions to the coated surfaces of the confections 101 as they pass along the endless conveyor 102 for discharge from the enrober. The movement of the band 95 is such as to impart impressions to the surface of the coated confections 101 and owing to the yieldable character of the material comprising the band 95 and the combined rotary and reciprocal movement caused by the crank-arms 47—48 and 51—52, there is a variation in the direction of impact so that the decorative effect imparted by the perforated band 95 will vary on each type of coated confection 101 depending upon the top surface area, contour and height thereof. The flexible band 95 may be perforated or solid and is so suspended as not to be self-sustaining nor form-retaining in its contacting cooperation with the confections 101. The perforations 100 in the band 95 also renders such even more flexible than it would otherwise be for the same thickness and expanse of material, although the perforations 100 may be provided for this purpose or for varying the decoration or for both functions. To this end, the endless conveyor 102 and the enrober may be continuously and intermittently moved depending upon the dictates of commercial practice.

Then, too, the extent to which the flexible band 95 may be caused to yield upon contact with the coated confections 101, may be varied by adjusting the vertical position of the crossbars 43—55 which are free to move within the limits of the elongated openings 44—46 and 56—57 provided in the end members 10—11, respectively. This adjustment coupled with a variation in speed of the motor 24 as well as its reversible rotation will vary the extent and direction of the impact to the coated confections 101. To this end, the flexible band 95 is suspended and operated so that its initial stationary contour will vary during and responsive to the extent and speed of displacement occasioned, in this instance, by the extreme flexibility and character of the band 95 as well as the opposite rotation of the cranks 47—48 and 51—52 before, during and after contacting cooperation between the flexible band 95 and confections 101. The variation in U-shaped contour responsive to the displacement of the flexible band 95 is accountable for the extent and direction of impact against the confections 101 so that the type of decoration imparted thereto will vary within a wide range depending upon relative speeds, direction of crank rotation, and the extent of contact.

Such variations are capable when effecting these adjustments which are readily made without entailing any appreciable time or labor. Then, too, the speed of the enrober conveyor 102 will also vary the type of directions imparted thereto by the flexible band 95 and, for that matter, the character of the impressions may be varied by simply substituting bands for different batches of coated confections.

In order that the excess coatings that may adhere to the band 95 will be returned to the enrober conveyor 102, the temperature of the band 95 is elevated by virtue of its proximity with a steam manifold 103 that is mounted within the confines of the band 95 so that the latter will contact therewith upon being elevated. Pipes 104 and 105 communicate with the steam manifold 103 to effect the support thereof by projecting through apertures 106—107 and 108—109 provided in the end frames 15—16. This properly supports the steam manifold 103 and serves to melt the excess coating that may adhere to the band 95 for deposit on the enrober conveyor 102.

It will be apparent, also, that access to the operating instrumentalities is always possible by merely removing the end plates 19—20 that enclose the compartments 22—23. With the arrangement of parts above described, a very simple, efficient and inexpensive decorating device has been provided that has a wide range of adjustment that will impart the desired decorative variations within the control of the attendant.

Various changes may be made in the embodiment of the invention herein specifically described without departing from the invention or sacrificing any of the features or advantages thereof, and nothing herein shall be construed as a limitation upon the invention, its concept or structural embodiment as to the whole or any part thereof except as defined in the appended claims.

I claim:

1. In a surface decorating apparatus, the combination with a flexible member, of spaced crank members for supporting said flexible member to define a non-rigid open loop, means for oppositely rotating said crank members to raise and lower said flexible member loop, means for varying the speed of flexible member movement in a substantially vertical path, means for changing the direction of crank member rotation to alter the movement of said flexible member relative to a non-yielding support, said flexible member loop being characterized by its ability to yield upon contact with confections disposed for non-yielding support in the path thereof, and means for varying the extent of movement of said flexible member loop relative to the non-yielding confection supporting path.

2. In a surface decorating apparatus, the combination with a substantially rectangular flexible member, of spaced crank members for supporting said flexible member to define an open loop, means for rotating said crank members to effect up and down movement of said flexible member, means for counter-balancing said crank members, means for varying the speed of flexible member movement, said flexible member being characterized by its ability to yield upon contact with confections disposed for non-yielding support in the path thereof, and means for varying the extent of movement of said flexible member relative to the non-yielding confection supporting path.

3. In a surface decorating apparatus, the combination with a flexible member, of means for supporting said flexible member to assume a substantially U-shaped depending configuration without rendering said flexible member self-sustaining nor form-retaining during the movement thereof, means for moving said flexible U-shaped member to effect the to and fro displacement thereof along a path toward and away from a confection supporting surface whereby variations in contour of said flexible member are effected independent of its contacting action with the confections, said flexible member being characterized by its ability to yield upon contact with confections disposed for non-yielding support in the path thereof, and means for varying the extent of movement of said flexible member relative to the non-yielding confection supporting path.

4. In a surface decorating apparatus, the combination with a flexible member, of moveable means for supporting said flexible member to assume a substantially U-shaped configuration without rendering said flexible member self-sustaining nor form-retaining during the movement thereof, said flexible member comprising a substantially rectangular expansive band, means for moving said flexible member so that the arcuate end of the U-shaped configuration thereof will intermittently contact confections in the path thereof, said flexible member being characterized by its ability to yield upon contact with confections disposed for non-yielding support in the path thereof, and means for varying the extent of movement of said flexible member relative to the non-yielding confection supporting path.

5. In a surface decorating apparatus, the combination with a flexible member, of moveable means for supporting said flexible member to assume a substantially U-shaped configuration without rendering said flexible member self-sustaining nor form-retaining during the movement thereof, said flexible member comprising a substantially rectangular expansive band, means for moving said flexible member so that the arcuate end of the U-shaped configuration thereof will intermittently contact confections in the path thereof, means for varying the speed of flexible member movement, said flexible member being characterized by its ability to yield upon contact with confections disposed for non-yielding support in the path thereof, and means for varying the extent of movement of said flexible member relative to the non-yielding confection supporting path.

6. In a surface decorating apparatus, the combination with a flexible member, of crank members for supporting said flexible member to assume a substantially U-shaped configuration, said flexible member comprising a substantially rectangular perforated expansive band, means for moving said flexible member so that the arcuate end of the U-shaped configuration thereof will intermittently contact confections in the path thereof, means for varying the speed of flexible member movement, said flexible member being characterized by its ability to yield upon contact with confections disposed for non-yielding support in the path thereof, and means for varying the extent of movement of said flexible member relative to the non-yielding confection supporting path.

7. In a surface decorating apparatus, the combination with a flexible member, of crank members for supporting said flexible member to assume a substantially U-shaped configuration, said flexible member comprising a non-endless perforated expansive band, means for moving said flexible member so that the arcuate end of the U-shaped configuration thereof will intermittently contact confections in the path thereof, means for varying the speed of flexible member movement, said flexible member being characterized by its ability to yield upon contact with confections disposed for non-yielding support in the path thereof, and means for varying the extent of movement of said flexible member relative to the non-yielding confection supporting path.

8. In a surface decorating apparatus, the combination with a flexible member, of spaced crank members for supporting said flexible member to assume a substantially U-shaped configuration without rendering said flexible member self-sustaining nor form-retaining during the movement thereof, said flexible member comprising an expansive band, means to simultaneously rotate said crank members for moving said flexible member so that the arcuate end of the U-shaped configuration thereof will intermittently contact confections in the path thereof, means for varying the speed of flexible member movement, said flexible member being characterized by its ability to vary in contour responsive to the rotation of said crank members and to yield upon contact with confections disposed for non-yielding support in the path thereof, and means for varying the extent of movement of said flexible member relative to the non-yielding confection supporting path.

9. In a surface decorating apparatus, the combination with a substantially rectangular flexible member, of spaced crank members for supporting said flexible member to assume a substantially U-shaped configuration, means for counter-balancing said crank members, said flexible member comprising a perforated expansive band, means for moving said flexible member so that the arcuate end of the U-shaped configuration thereof will intermittently contact confections in the path thereof, means for varying the speed of flexible member movement, said flexible member being characterized by its ability to yield upon contact with confections disposed for non-yielding support in the path thereof, and means for varying the extent of movement of said flexible member relative to the non-yielding confection supporting path.

10. In a confection coating surface decorating apparatus, the combination with conveyor means for supporting coated confections along a predetermined path, a substantially rectangular flexible band member, means for supporting said flexible band member to normally assume a substantially U-shaped configuration without rendering said flexible member self-sustaining and form-retaining during the movement thereof, power means for operating said last named means to move said flexible band member in cooperative relation to said conveyor means, and means for varying the position of said flexible band member supporting means to enable said flexible band member to impart a variety of effects upon coated confections supported by said conveyor means.

11. In a confection coating surface decorating apparatus, the combination with conveyor means for supporting coated confections along a predetermined path, of a flexible band member, spaced pairs of crank-arm means for supporting said flexible band member to normally assume a substantially U-shaped configuration, power means for operating said last named means to move said flexible band member in cooperative relation to said conveyor means, and means for varying the position of said flexible band member supporting means to enable said flexible band member to impart a variety of effects upon coated confections supported by said conveyor means.

12. In a confection coating surface decorating apparatus, the combination with conveyor means for supporting coated confections along a predetermined path, of a perforated flexible band member, spaced pairs of crank-arm means for supporting said flexible band member to normally assume a substantially U-shaped configuration, power means for oppositely rotating said last named means to move said flexible band member in cooperative relation to said conveyor means, and means for varying the position of said flexible band member supporting means relative to said conveyor means to enable said flexible band member to impart a variety of effects upon coated confections supported by said conveyor means.

13. In a confection coating surface decorating apparatus, the combination with conveyor means for supporting coated confections along a predetermined path, of a perforated flexible band member, spaced pairs of crank-arm means for supporting said flexible band member to normally assume a substantially U-shaped configuration without rendering said flexible member self-sustaining and form-retaining during the movement thereof, power means for oppositely rotating said last named means to move said flexible band member in cooperative relation to said conveyor means so that the arcuate end of the U-shaped configuration thereof will intermittently contact confections in the path thereof, means for varying the position of said flexible band member supporting means to enable said flexible band member to impart a variety of effects upon coated confections supported by said conveyor means, and means for elevating the temperature surrounding said flexible band member to return excess coating material to said conveyor means.

14. In a surface decorating apparatus for coated candies, the combination with a flexible decorating member that is not self-sustaining nor form-retaining, means for suspending said flexible decorating member to confront the path of confection support without rendering said flexible member self-sustaining and form-retaining during the movement thereof, and means for effecting to and fro displacement of said flexible decorating member responsive to the movement of said last named suspending means to impart variations in the contour to said suspended flexible decorating member while moving to and fro relative to the confection supporting path independent of its contacting action with the confections, said flexible decorating member being characterized by its ability to further yield upon contact with freshly coated confections disposed for non-yielding support in the path thereof to impart decorative effects thereto.

15. In a surface decorating apparatus for coated candies, the combination with a flexible decorating member that is not self-sustaining nor form-retaining, movable means for suspending said flexible decorating member to confront the path of confection support without rendering said flexible member self-sustaining and form-retaining during the movement thereof, and means for effecting to and fro displacement of said flexible decorating member responsive to the movement of said last named movable suspending means to effect variations in the contour of said suspended flexible decorating member while moving to and fro relative to the confection supporting path independent of its contacting action with the confections, said flexible decorating member being characterized by its ability to further yield upon contact with freshly coated confections disposed for non-yielding support in the path thereof to impart decorative effects thereto.

16. In a surface decorating apparatus, the combination with conveying means for supporting freshly coated confections along a predetermined path, of a flexible decorating member that is not self-sustaining nor form-retaining, spaced means for suspending said flexible decorating member above said conveyor means without rendering said flexible member self-sustaining and form-retaining during the movement thereof, and means for oppositely displacing said spaced suspending means to effect variations in the contour of said suspended flexible decorating member before, during and after contact with the freshly coated confections on said conveying means.

17. In a surface decorating apparatus, the combination with conveying means for supporting freshly coated confections along a predetermined path, of a flexible non-endless decorating member that is not self-sustaining nor form retaining, spaced means for suspending said flexible decorating member above said conveyor means to assume a substantially U-shaped configuration, and means for oppositely rotating said spaced suspending means to effect variations in the contour of said suspended flexible decorating member before, during and after contact with the freshly coated confections on said conveying means.

18. In a confection coating decorating apparatus, the combination with a flexible decorating member, of movable mounting means for said flexible decorating member to define a depending arcuate flexible portion that is not self-sustaining nor form retaining in conjunction with said mounting means, and means for moving said flexible decorating member mounting means so that said depending arcuate flexible portion of said decorating member is displaced to and fro relative to comparatively non-yielding confection surfaces having a coating temporarily more yielding than said flexible member, the movement of said mounting means simultaneous with said depending arcuate flexible portion of said decorating member varying the contour of the latter during its to and fro displacement.

19. In a confection coating decorating apparatus, the combination with a flexible decorating member, crank means for mounting said flexible decorating member to define a depending arcuate flexible portion that is not self-sustaining nor form retaining in conjunction with said mounting means, and means for moving said flexible decorating member crank mounting means so that said depending arcuate flexible portion of said decorating member is displaced to and fro relative to comparatively non-yielding confection surfaces having a coating temporarily more yielding than said flexible member, the movement of said mounting means simultaneous with said depending arcuate flexible portion of said decorating member varying the contour of the latter during its to and fro displacement.

20. In a confection decorating apparatus, the combination with a flexible decorating member, of crank means for mounting said flexible decorating member to define a depending arcuate flexible portion that is not self-sustaining nor form retaining, and means for continuously rotating said flexible decorating member crank mounting means so that said depending arcuate flexible portion of said decorating member is displaced to and fro relative to comparatively non-yielding confection surfaces having a coating temporarily more yielding than said flexible member, the movement of said depending arcuate flexible portion of said decorating member varying the contour thereof during its to and fro displacement.

21. In a confection coating decorating apparatus, the combination with a flexible decorating member, a plurality of means for mounting said flexible decorating member to define a depending arcuate flexible portion that is not self-sustaining nor form retaining, means for simultaneously moving said mounting means and said flexible decorating member so that said depending arcuate flexible portion of said decorating member is displaced to and fro relative to comparatively non-yielding confection surfaces having a coating temporarily more yielding than said flexible member, the movement of said mounting means and said depending arcuate flexible portion of said decorating member varying the contour of the latter during its to and fro displacement, and means for simultaneously adjusting said mounting means to raise or lower said decorating member relative to the confections to be coated.

LEO LATINI.